(12) United States Patent
Stawski et al.

(10) Patent No.: US 11,034,431 B2
(45) Date of Patent: Jun. 15, 2021

(54) COMPOSITE ARTICLE WITH FLY-AWAY BAG CARRIER

(71) Applicant: The Boeing Company, Chicago, IL (US)

(72) Inventors: Stanley W. Stawski, Camano Island, WA (US); Christopher E. Plass, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 674 days.

(21) Appl. No.: 15/714,344

(22) Filed: Sep. 25, 2017

(65) Prior Publication Data

US 2019/0092449 A1   Mar. 28, 2019

(51) Int. Cl.
| | |
|---|---|
| *B29C 70/44* | (2006.01) |
| *B29C 44/06* | (2006.01) |
| *B29C 44/12* | (2006.01) |
| *B64C 3/24* | (2006.01) |
| *B64C 3/20* | (2006.01) |
| *B29C 65/00* | (2006.01) |
| *B33Y 80/00* | (2015.01) |
| *B29L 31/30* | (2006.01) |
| *B29C 65/48* | (2006.01) |

(52) U.S. Cl.
CPC .............. *B64C 3/24* (2013.01); *B29C 44/06* (2013.01); *B29C 44/1228* (2013.01); *B29C 66/7212* (2013.01); *B29C 66/73111* (2013.01); *B29C 66/73752* (2013.01); *B29C 70/443* (2013.01); *B33Y 80/00* (2014.12); *B64C 3/20* (2013.01); *B29C 65/488* (2013.01); *B29C 66/131* (2013.01); *B29L 2031/3085* (2013.01)

(58) Field of Classification Search
CPC ...... B29C 33/505; B29C 33/52; B29C 33/448
USPC ......................................................... 156/242
See application file for complete search history.

(56) References Cited

U.S. PATENT DOCUMENTS

| | | | | |
|---|---|---|---|---|
| 7,625,618 | B1* | 12/2009 | Allen ....................... | B29C 70/44 |
| | | | | 428/36.91 |
| 7,861,969 | B2* | 1/2011 | Guzman .................. | B29C 43/10 |
| | | | | 244/120 |
| 9,149,999 | B2* | 10/2015 | Thiagarajan .............. | B32B 3/12 |
| 2014/0076479 | A1* | 3/2014 | Bartel ...................... | B29C 53/42 |
| | | | | 156/73.1 |
| 2014/0284431 | A1 | 9/2014 | Grankaell et al. | |
| 2015/0137430 | A1* | 5/2015 | Lyons .................... | B29C 33/505 |
| | | | | 264/554 |
| 2016/0009379 | A1* | 1/2016 | Witte ........................ | B32B 5/02 |
| | | | | 244/1 A |
| 2020/0149419 | A1* | 5/2020 | Peeters ..................... | B64C 3/18 |

* cited by examiner

FOREIGN PATENT DOCUMENTS

EP      1800825  A1      6/2007

*Primary Examiner* — Matthew J Daniels
*Assistant Examiner* — Hana C Page
(74) *Attorney, Agent, or Firm* — MH2 Technology Law Group LLP

(57) ABSTRACT

Provided is a method for forming a co-cured composite article. The method includes: providing a bag carrier; providing a vacuum bag, wherein the vacuum bag at least partially surrounds the bag carrier; providing an outer skin, wherein the outer skin at least partially surrounds the vacuum bag; forming a space between the bag carrier and the outer skin; and providing a filler between the outer skin and the bag carrier.

25 Claims, 14 Drawing Sheets

COMPOSITE ARTICLE WITH FLY-AWAY BAG CARRIER

TECHNICAL FIELD

The subject matter described herein relates generally to composites manufacturing and, more particularly, to the manufacturing of composite articles having integrated fly-away bag carrier, and including methods for forming a composite cocure part with a fly-away bag carrier.

BACKGROUND

Composite structures are used in a wide variety of applications. In aircraft construction, composites are used in increasing quantities to form the fuselage, wings, and other components of the aircraft. The wings of an aircraft are generally hollow structures that may require a smooth and dimensionally-accurate outer mold line (OML) surface. Aircraft parts, including the wings and wing components such as flaps, may be constructed of composite skin members and may include internal structural components such as ribs, spars, and/or stiffeners to increase the strength and bending stiffness of the wings. The internal structural components may require individual assembly to support the OML surface for forming the composite skin. However, some support structures may be removed after curing of the composite members which is further time consuming.

In conventional construction techniques for forming three-dimensional composite structures such as an aircraft wing or wing components, cured composite components such as wing spars may be assembled to composite skin members by mechanical fastening. The process of assembling the composite components may require the use of a large quantity of mechanical fasteners and specialized tooling for maintaining the relative positions of the composite components. Unfortunately, the process of forming cured composite components in a separate step and then later assembling such components using mechanical fasteners is a time-consuming and labor-intensive process. In addition, the mechanical fasteners may increase the overall weight of the composite structure. Furthermore, mechanical fasteners that are installed in OML surfaces may disrupt the aerodynamics of the composite structure.

A composite structure may also be formed by fitting together uncured composite components using a tool. Conventional processes for forming hollow composite structures also include the use of internal tooling. For composite structures having hollow, non-draftable geometry, the internal tooling must be removable from the interior of the composite part after curing. An inflatable mandrel may be installed within a hollow composite layup that may be positioned within a closed mold. The inflatable mandrel (sometimes simply referred to as a "bag" or "vacuum bag") may be inflated to apply an internal compaction pressure on the composite layup against the mold to consolidate the composite layup. Heat may be applied to cure the composite layup. After curing of the composite layup, the bag may be deflated and removed from the cured composite structure. One such example is the system and method described in U.S. Patent Application Publication No. 2015/0137430 published on May 21, 2015, the contents of which are incorporated by reference herein in its entirety.

Composite structures made from fibrous materials and various resins are finding increased use as substitutes for metal in aircraft and other structures. However, fabrication of composite items is relatively more complicated than metal fabrication. Generally, composite items are built up, layer upon layer on a mold or the fiber component is placed and then impregnated with resin. Afterward, the item is cured and removed from the mold. While some shapes are relatively easy to generate in this manner, others are not. Thus, some components such as air vehicle control surface structures which can include flaps, rudders, elevators, ailerons and the like, are not regularly assembled from co-cured components due to the difficulty to assemble the internal structures of a co-cured part.

Accordingly, it is desirable to develop a three-dimensional composite structure and methods for fabricating such three-dimensional composite structure in order to overcome limitations of conventional composite structures and conventional fabrication methods.

SUMMARY

In an example, there is a method for forming a co-cured composite article. The method includes: providing a bag carrier; providing a vacuum bag, wherein the vacuum bag at least partially surrounds the bag carrier; providing an outer skin, wherein the outer skin at least partially surrounds the vacuum bag; pressurizing the vacuum bag, wherein at least a portion of the pressurized bag is positioned to define a space between the outer skin and the bag carrier; and providing a filler between the outer skin and the bag carrier.

In another example, there is a composite article, comprising: a bag carrier comprising an inner skin; an outer skin, wherein outer skin at least partially surrounds the bag carrier; and a filler disposed between the bag carrier and outer skin.

Advantages of the examples will be set forth in part in the description which follows, and in part will be understood from the description, or may be learned by practice of the examples. The advantages will be realized and attained by means of the elements and combinations particularly pointed out in the appended claims.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this specification, illustrate examples of the present teachings and together with the description, serve to explain the principles of the disclosure.

DETAILED DESCRIPTION

Figure 1A:
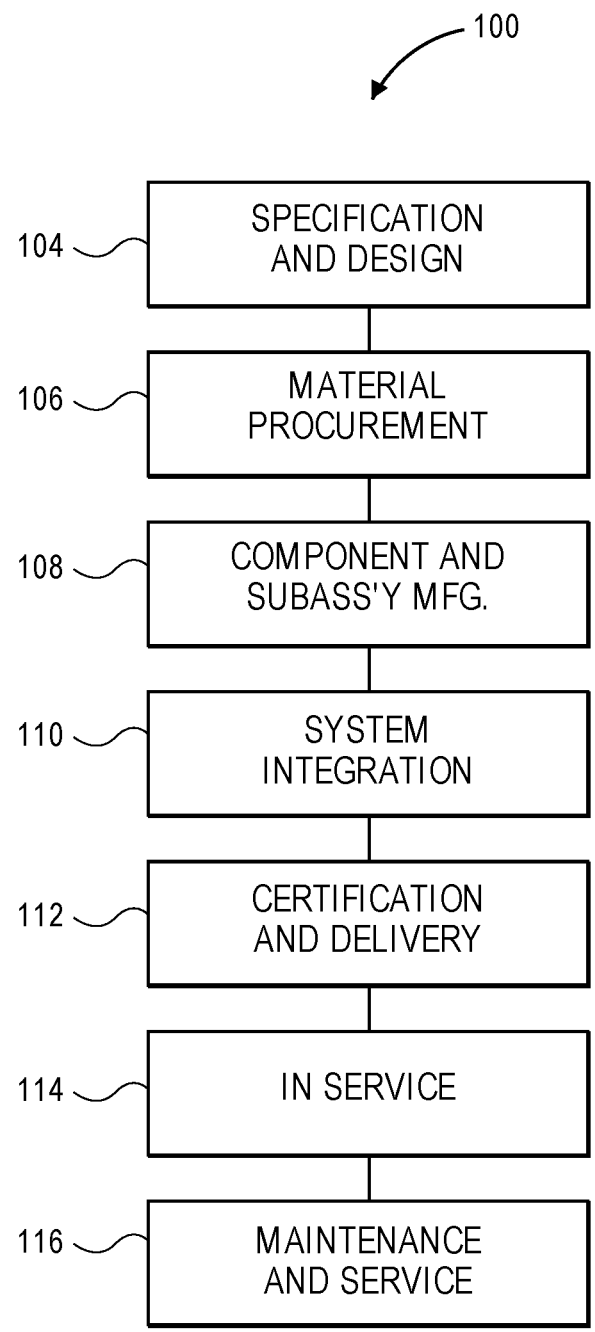
FIG. 1A is a flow diagram of aircraft production and service methodology, according to an example.

Reference will now be made in detail to the present examples, examples of which are illustrated in the accompanying drawings. Wherever possible, the same reference numbers will be used throughout the drawings to refer to the same or like parts.

Notwithstanding that the numerical ranges and parameters setting forth the broad scope of the examples are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter may take on negative values. In this case, the example value of range stated as "less than 10" may assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present examples. It is intended that the specification and examples be considered as exemplary only. The various examples are not necessarily mutually exclusive, as some examples may be combined with one or more other examples to form new examples. It will be understood that the structures depicted in the figures may include additional features not depicted for simplicity, while depicted structures may be removed or modified.

As described herein, a co-cured composite article may be assembled into a structural component for use in a larger structure such as a land-based vehicle, an aircraft, a space vehicle, or a waterborne vehicle. By way of example, aircraft structures such as wings and tails commonly include structural components formed from composite materials. In some instances, support structures used for support during forming and curing of a composite skin may remain in the final part which is then incorporated into an aircraft either because it is inconvenient or impossible to remove them after curing of the part. These are sometimes referred to as "fly away" articles and can add unnecessary weight to an aircraft. Thus, examples described herein allow composite structures to be assembled as composite articles that include fly-away bag carriers. More specifically, the examples provide methods for making a co-cured composite article, which may be an air vehicle lift component such as a composite wing comprising an integrated fly-away bag carrier. Advantages of the various examples described herein provide for the forming of articles having complex shapes and with high strength structures. Additionally, in some examples, the methods and/or articles are described with respect air vehicle. However, the examples are not so limited and the methods and/or articles may be applied to the forming of other parts, including any moldable/co-curable part.

Figure 1B:
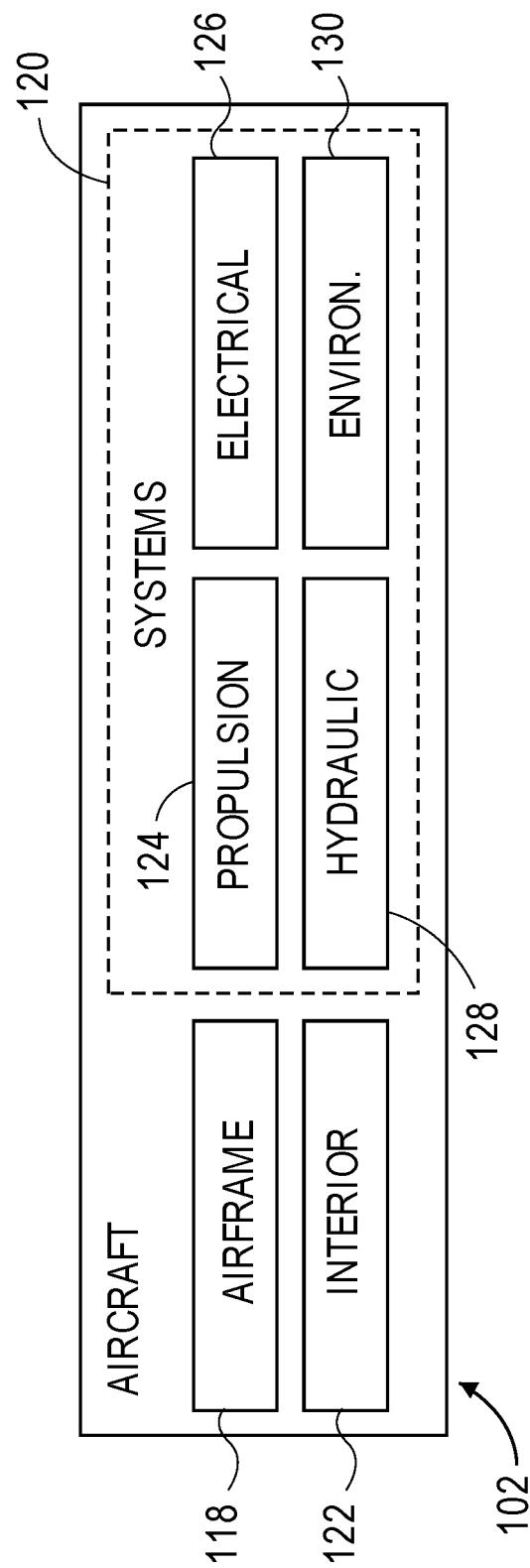
FIG. 1B is a block diagram of an aircraft, according to an example.

Referring more particularly to the drawings, examples of the disclosure may be described in the context of an aircraft manufacturing and service method 100 as shown in FIG. 1A and an aircraft 102 as shown in FIG. 1B. Turning to FIG. 1A, during pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 may be scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 1B, the aircraft 102 which may be manufactured and serviced according to exemplary method 100 may include an airframe 118 with a plurality of systems 120 and an interior 122. Examples of systems 120 include one or more of high-level systems such as a propulsion system 124, an electrical system 126, a hydraulic system 128, and an environmental system 130. Any number of other systems may be included. Although an aerospace example is shown, the principles of the invention may be applied to other industries, such as the automotive industry.

Figure 2A:
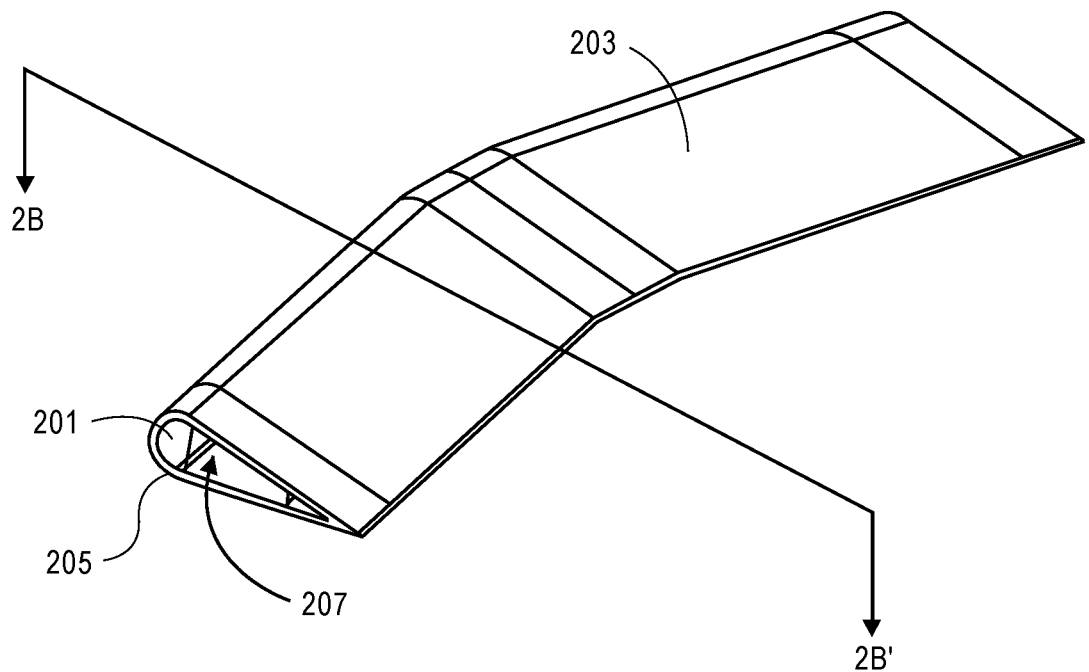
FIG. 2A is a perspective view of a composite article, for example, a composite cocure part comprising a fly-away bag carrier, according to at least one example that may be formed by according to a fabrication method as described herein.

As illustrated in the perspective view of FIG. 2A, composite article 200, which may be a co-cured component such as a composite portion of an air vehicle, such as an airplane wing, may include an inner skin 201, an outer skin 203, a filler 205, and an integrated bag carrier 207. The bag carrier may be at least partially disposed within the composite article 200, for example, at an interior portion 202. The outer skin 203 may be provided such that it at least partially surrounds the bag carrier 207. The filler 205 may be disposed between the bag carrier 207 and the outer skin 203, for example, between inner skin 201 and the outer skin 203.

Optionally, the bag carrier can be provided to include inner skin 201, or maybe provided separately from and then at least partially surrounded by the inner skin 201 as one or more separate steps of a fabrication process. In an implementation, the bag carrier is 3-D printed. For example, the bag carrier may comprise support structures that are 3-D printed as a single structure or separately and assembled into the bag carrier. In an example, the inner skin may also be 3-D printed, for example, together with the support structures that form the bag carrier. In an implementation, the inner skin may comprise a cured composite material. For example, at least one uncured composite layer may be formed on and supported by the bag carrier and may be cured prior to forming the outer skin, or may be co-cured together with the outer skin.

Figure 2B:
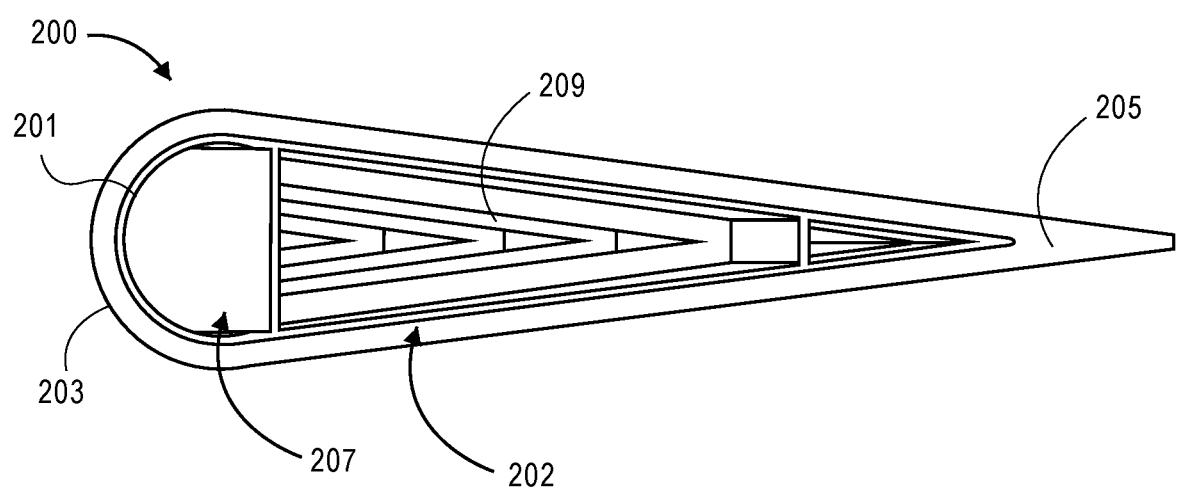
FIG. 2B is a cross section of the composite article of FIG. 2A.

As shown in the cross sectional view at FIG. 2B according to line 2B-2B' in FIG. 2A, a composite article 200, which may be a component of an air vehicle, such as a wing, may include an integrated bag carrier 207 which may comprise support structures such as structural components 209.

The inner skin 201, the outer skin, 203 or both may include any suitable material. Examples of suitable materials include fiber reinforced plastics, metal and/or other structural material. Particularly suitable materials include, for example, carbon fiber reinforced plastic. In such carbon fiber reinforced plastics, a plastic matrix includes any suitable polymer such as, for example, epoxy and the like. For example, the inner skin 201 may comprise a 3-D printed material and the outer skin may comprise a carbon fiber reinforced plastic. In an example, the outer skin 203 may comprise a plurality of cured composite plies formed around at least a portion of the bag carrier 207, for example, around at least a portion of the inner skin 201.

Inner skin 201 may be cured, bonded or otherwise connected to structural components 209 of the bag carrier 207. In an example, the structural components 209 of the bag carrier 207 include spars, trusses, beams, ribs, stringers, and other support features. The structural components may comprise a suitable material. In an implementation, the spars and/or ribs are 3-D printed. For example, the spars and/or ribs may be 3-D printed together as a single structure or may be 3-D printed separately and assembled into a single structure. Thus, in example, support structures such as structural components 209 may be incorporated in a composite article 200 to provide better stress distribution and also to prevent the inner skin 201 from moving prior to, during, and/or after a curing process, such as during curing to form the outer skin 203.

The filler 205 may be disposed between the bag carrier 207 and the outer skin 203. In an example, filler 205 may be disposed between the support structures, such as structural components 209, and the outer skin 203. In an example, filler 205 may be disposed between inner skin 201 and the outer skin 203, such as in an implementation in which inner skin 201 at least partially surrounds the support structures, such as structural components 209. Accordingly, the outer skin 203 may be supported by the filler 205, which in turn may be supported by the bag carrier, which may optionally comprise the inner skin 201. In other words, filler 205 may be provided between outer skin 203 and inner skin 201 and may physically touch at least a portion of the outer skin 203 and/or at least a portion of the inner skin 201.

In an embodiment, the filler comprises a solid foam. The solid foam may comprise a thickness that is in the range of from 10% to 200% of the thickness of the outer skin, including from 50% to 100% of the thickness of the outer skin. For example, solid foam may comprise a thickness of from about 0.02" to about 1", for example, from about 0.05" to about 0.125".

Figure 3:
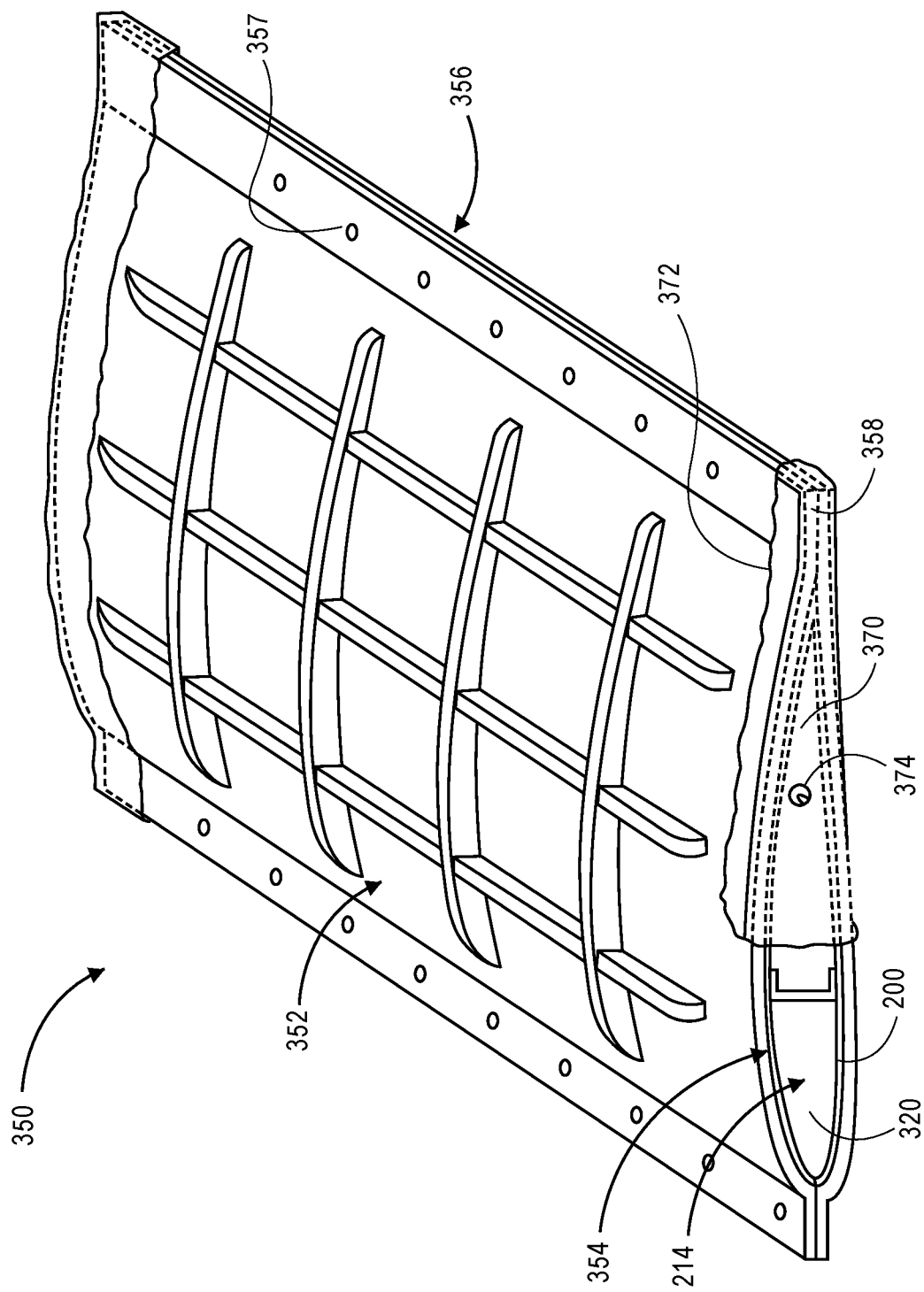
FIG. 3 is a perspective view of an example of a closed mold tooling system having an outer mold line (OML) tool and vacuum bagging system (e.g., a vacuum bag) positioned between a bag carrier and an outer skin that may be processed within the OML tool.

Shown in FIG. 3 is a tooling system 350 (e.g., a closed mold tooling system) as may be implemented for processing a composite article 200 comprising an integrated bag carrier, as in a co-curing process for forming a composite airfoil of an aircraft, wherein the airfoil comprises a fly-away bag carrier. The tooling system 350 may include an outer mold line (OML) tool 352 and a vacuum bagging system 370. Each vacuum bagging system 370 may include at least one vacuum bag 372 coupled to a vacuum source 374. In FIG. 3, the OML tool 352 may be comprised of two OML tool halves (e.g., a clamshell mold) including a lower mold 356 and an upper mold 357, collectively defining an OML tool surface 354. For example, the lower mold 356 may be a lower airfoil OML layup mold and the upper mold 357 may be an upper airfoil OML layup mold. The OML tool surface 354 may define a surface of the outer skin 203 for the composite article 200. The OML tool 352 may encapsulate the composite article 200 and one or more, including all vacuum bagging system 370. Each vacuum bagging system 370 may comprise a bag or a mandrel that may be positioned within interior portion 202 of the composite article 200, for example between the integrated bag carrier 207 and the outer skin 203, for example, between inner skin 201 and the outer skin 203. The OML tool 352 may be formed of Invar or any metallic or non-metallic material including composite material (e.g., carbon fiber) that is compatible with the composite article 200 with regard to the coefficient of thermal expansion of the composite article 200 material. The OML tool upper and lower molds may include tool flanges to facilitate mating of the upper and lower molds along a tool seam using a plurality of mechanical fasteners or other means.

The OML tool 352 may include external ribs or other stiffening members which may extend in various directions along the OML tool 352 and which may provide the OML tool 352 with sufficient stiffness to react internal compaction pressure generated by the internal vacuum bag 372 for forming the composite article 200. In addition, the OML tool 352 may also be configured with sufficient stiffness to counteract autoclave pressure under repeated cycles at relatively high processing (e.g., consolidating, curing, molding, glass transition, etc.) temperatures. The OML tool surface 354 may have a relatively high level of surface finish (e.g., a relatively low level of surface roughness) to provide a smooth surface finish to the composite article 200.

In FIG. 3, the OML tool 352 may include one or more tool ends 358 that may be generally open. At least one vacuum bag 372 may be sealed over the tool ends 358 using a bag edge sealant such as vacuum bag sealant or a high-temperature vacuum bag sealant tape to sealingly enclose the tool interior. The vacuum bag 372 may be fluidly coupled to a vacuum source 374 such that a vacuum pressure may be provided to the tool interior to generate internal compaction pressure against an inner surface of the composite article 200. Although not shown, the OML tool 352 may optionally include one or more rigid end caps that may be mounted to one or more of the tool ends 358 for examples wherein the vacuum bagging system 320 comprises a an expandable mandrel (e.g., a vacuum bag) for generating internal compaction pressure against the part inner surface of the composite article 200. The expandable mandrel may include a foam mandrel covered with a bag (e.g., pleats in a bag). The vacuum system of the examples may be that as described in U.S. Patent Application Publication 2014/0117593, published on May 1, 2014, the entire contents of which are incorporated by reference herein by reference. As used herein, the "vacuum bag" may refer to a vacuum bag formed around a mandrel or bag carrier as understood in the art.

The tooling system 350 may facilitate the co-bonding and/or co-curing of the inner skin 201, the outer skin 203, and/or the inner skin 201 to the bag carrier's support structures during the application of heat and/or internal compaction pressure generated by using the vacuum bag 372 to form a space between the bag carrier 207 and the outer skin 203. Advantageously, a vacuum bagging system and co-curing method disclosed herein provides for the application of substantially uniform internal compaction pressure to the composite article 200 positioned in an OML tool such as that of tooling system 350. During the application of the internal compaction pressure, the composite article 200 may be heated to a predetermined temperature for a predetermined period of time to allow for curing of the composite components of the composite article 200 into a unitized composite structure. By way of example, composite materials used in the aerospace industry are commonly heated to a temperature range between 30° C. and 200° C. and are subjected to pressures between 15 psi and 100 psi. It is noted, however, that curing of the composite components is not limited to only those methods requiring the application of heat to the composite but may instead (or in addition to) include other curing processes, depending on the material(s) used in forming the composite structure. In an example, the curing may be performed at room temperature.

The operations shown in FIGS. 4A-4K are described herein and may be executed in a method of manufacturing a composite article that includes an integrated bag carrier. In general, such a method includes providing a bag carrier; providing vacuum bag, wherein the vacuum bag at least partially surrounds the bag carrier; providing an outer skin, wherein the outer skin at least partially surrounds the vacuum bag; pressurizing the vacuum bag, wherein at least a portion of the pressurized bag is positioned to define a space between the outer skin and the bag carrier; and providing a filler between the outer skin and the bag carrier.

Figure 4A:
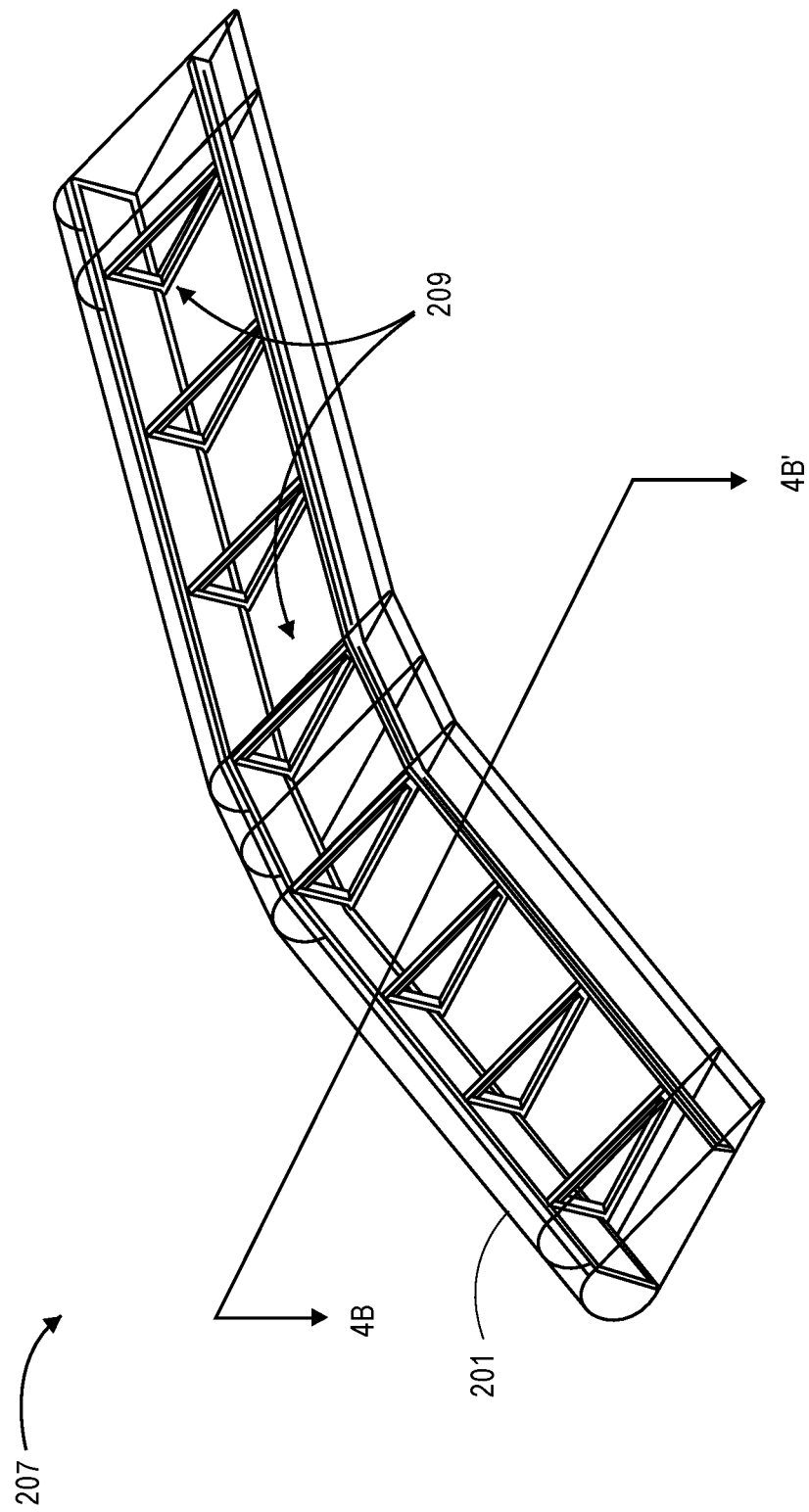
FIGS. 4A-4K illustrate various stages of fabrication of a composite article, such as the composite cocure part of FIGS. 2A-2B, according operations in a manufacturing process of at least one example.
Figure 4B:
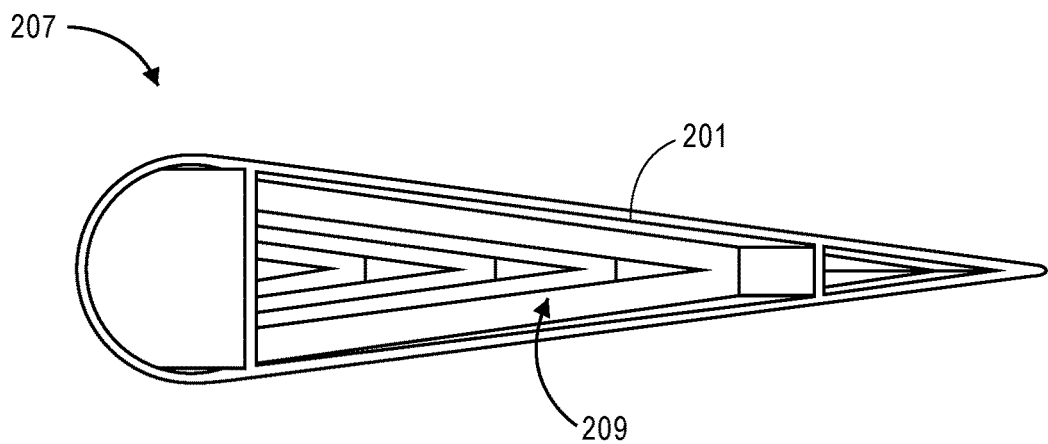
Figure 4C:
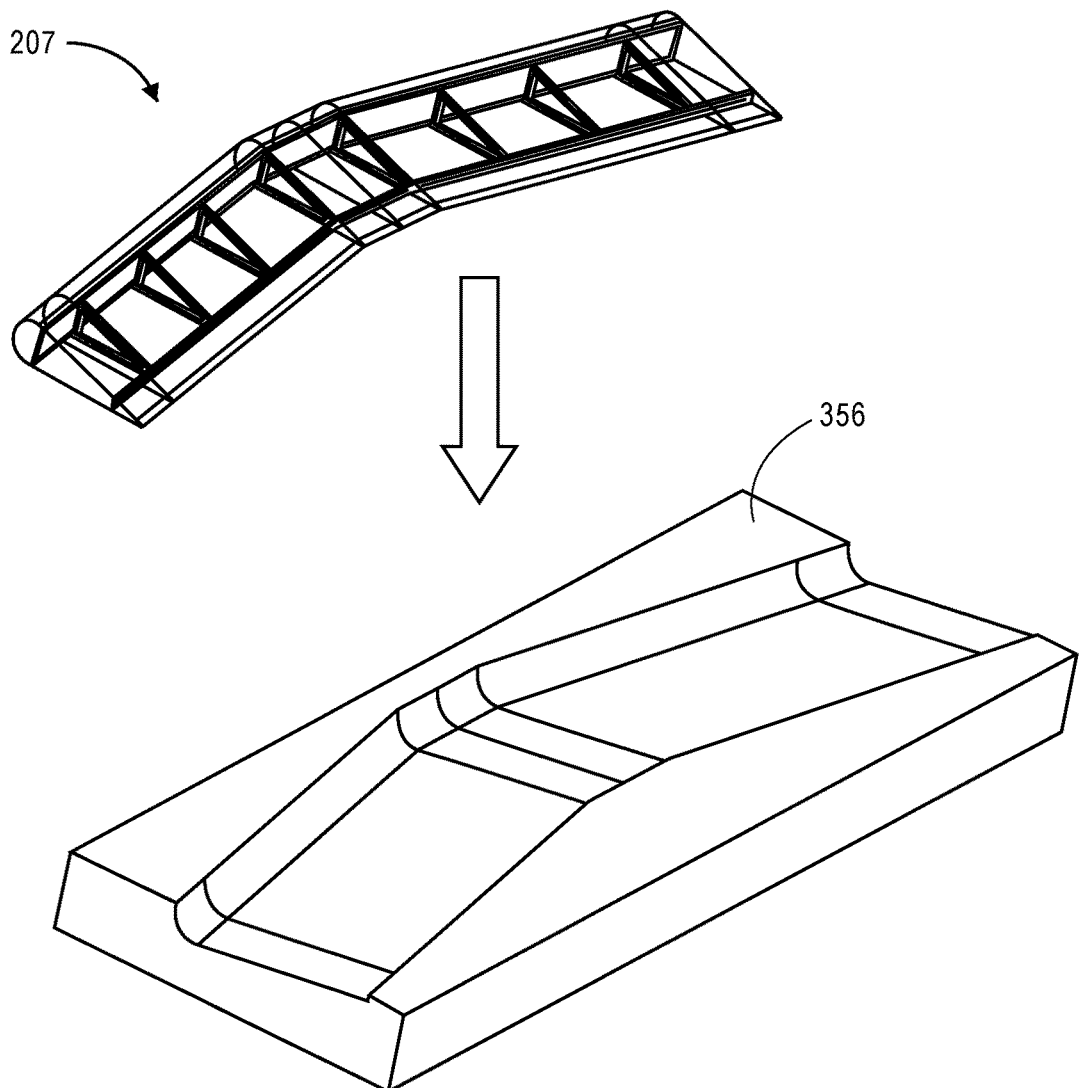

For example, as depicted in FIGS. 4A-4B, a bag carrier 207 is provided. As described above, the bag carrier 207 comprises support structures such as structural components 209. In an implementation, support structures such as structural components 209 may be formed by 3-D printing. In other words, the providing of the bag carrier 207 may comprise 3-D printing the bag carrier. Optionally, the bag carrier 207 may comprise inner skin 201. As depicted in FIG. 4C, a lower mold 356 of an OML tooling system mold is provided. The OML tooling system mold may comprise a cavity that accepts the bag carrier for further processing.

Figure 4D:
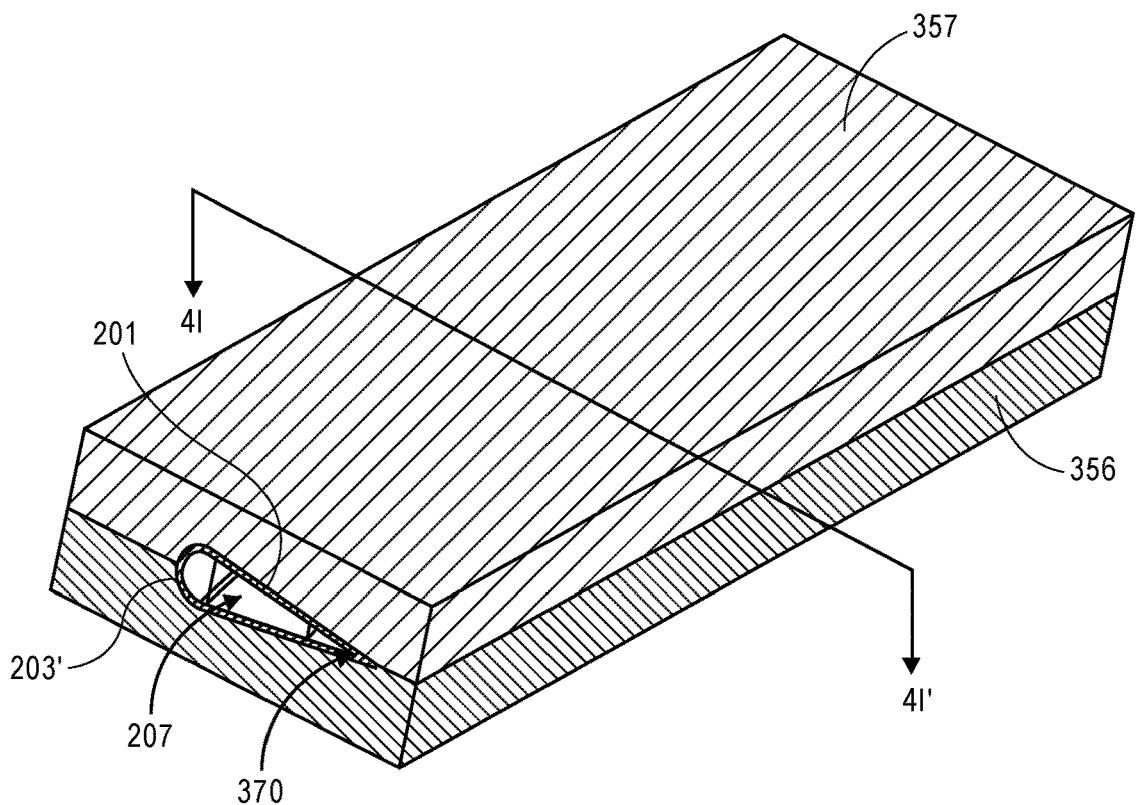
Figure 4E:
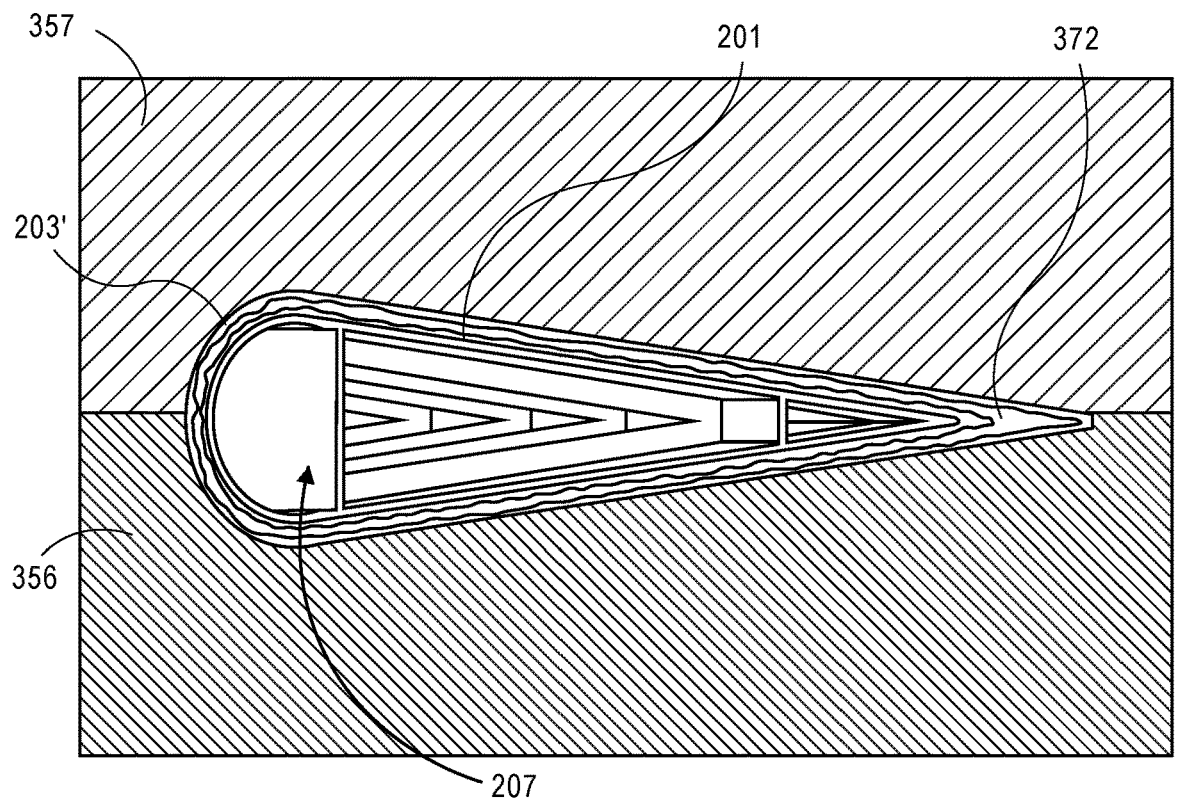
Figure 4F:
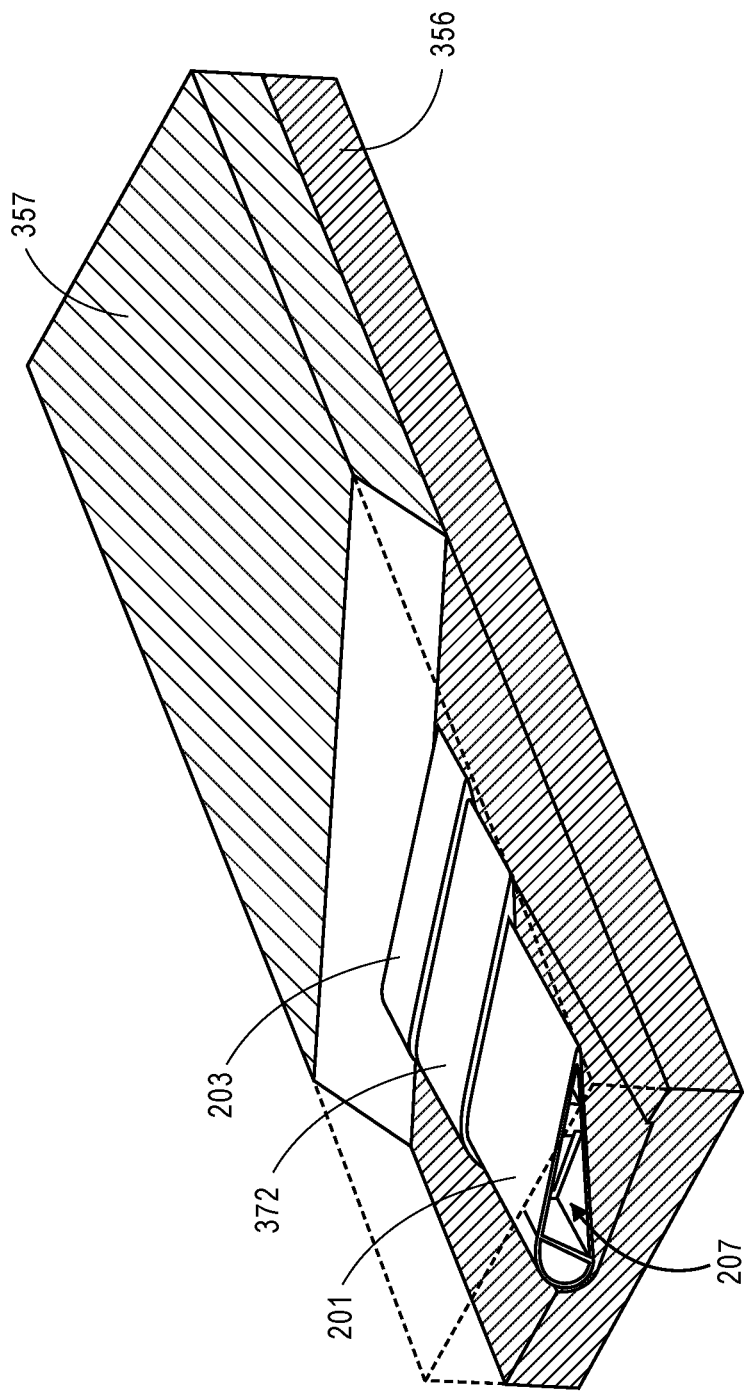

As shown in FIGS. 4D-4F, a vacuum bagging system that includes vacuum bag 372, may be positioned so as to at least partially surround bag carrier 207. That is, the vacuum bag 372 may be configured such that it seals the OML tooling system as shown in FIG. 3 and described above, but may also extend to locations such as between bag carrier 207 and outer skin 203 as illustrated in FIGS. 4D-4F.

As shown in FIG. 4D, an upper mold 357 may be positioned as described for the OML tool of FIG. 3. To form the outer skin 203 of the composite article 200, at least one composite layer is provided initially uncured and formed over the bag carrier and separated from the bag carrier by the vacuum bagging system, such as by vacuum bag 372. For example, outer skin 203 may initially be formed as an uncured outer skin. For example, plies of uncured composite may be provided around vacuum bag 372 which itself is disposed around the bag carrier 207.

Figure 4G:
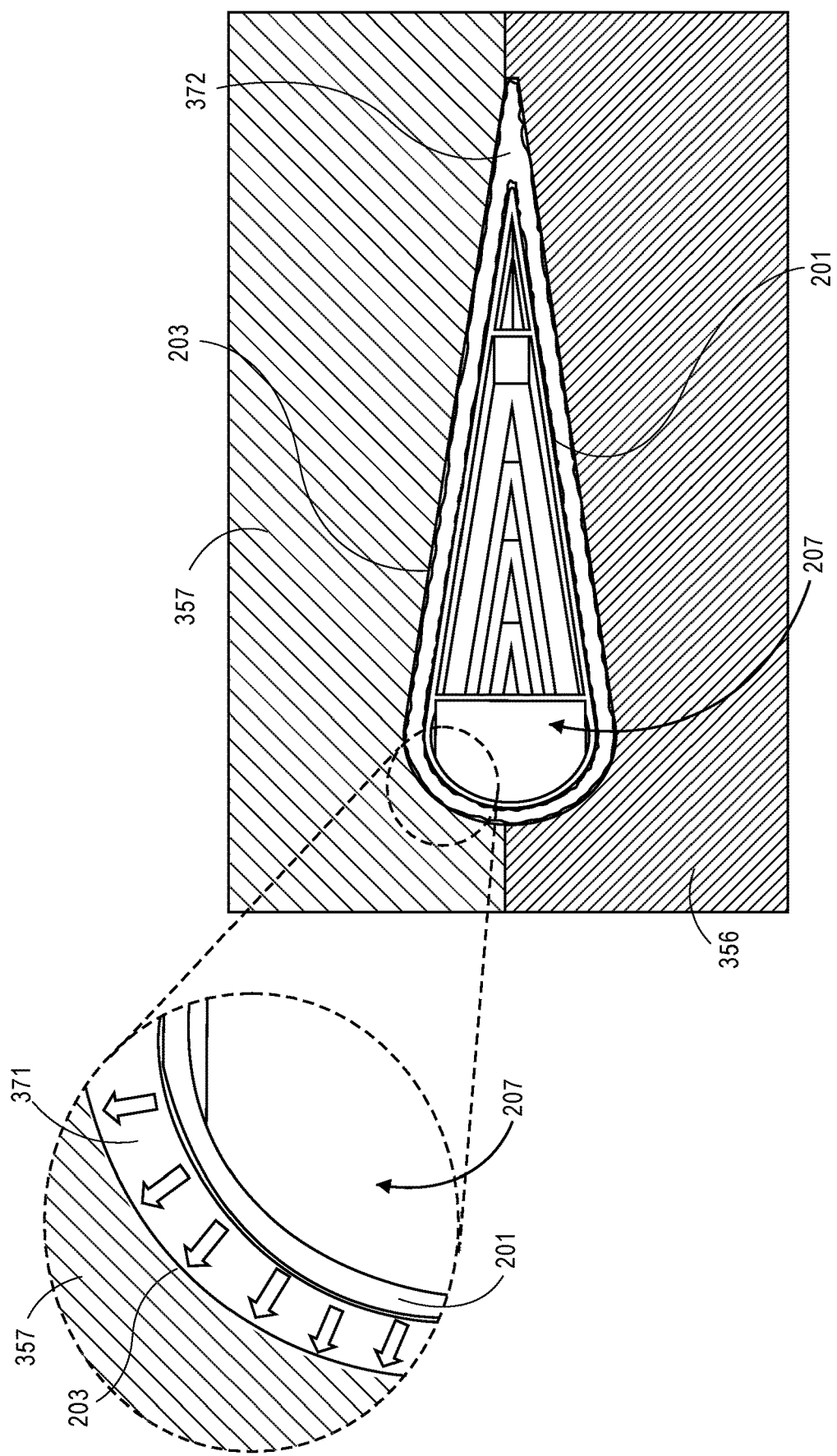

The uncured outer skin may then be cured in the OML tool along with other composite structural components of the composite article. For example, the uncured plies of the composite material may be acted on by the vacuum bag 372 as it conforms to surfaces, resulting in outer skin 203 of vacuum bag 372 acting against the uncured plies and conforming to an inner surface of each of the upper and lower molds. Also, at least a portion of the bag is positioned to define a space 371 between the outer skin and the bag carrier as shown in the inset of FIG. 4G. Therefore, as vacuum bag 372 is exposed to a vacuum, certain portions of it will appear to collapse as is removed from therein and certain portions of it will appear to inflate as outside pressure from the environment acts to push against sidewalls of the vacuum bag. Thus, as certain portions of the vacuum bag are acted on by the outside pressure, the vacuum bag itself may be configured to provide structural support against certain surfaces, such as against an outer skin (as indicated by the broad arrows in the inset in FIG. 4G) as it conforms to a geometry defined by, for example, the inner surface of each of the upper and lower molds. Accordingly, the bag expands such that it applies a force against the uncured composite plies. The uncured composite plies are pressed against the surfaces of the upper/lower molds and may, therefore, be cured to indefinitely retain the shape defined by the upper/lower molds thereby defining a skin surface. As the bag expands, a space 371 between the bag carrier 207 and the outer skin 203 is defined.

Vacuum bag 372 may be removably placed around the bag carrier such that, for example, upon at least partially curing, outer skin 203 remains separated from the bag carrier 207 by space 371. In an implementation, bag carrier is completely removed from between inner skin 201 and outer skin 203. In an implementation only at least a portion of the vacuum bag is removed from between the outer skin and the bag carrier.

Figure 4H:
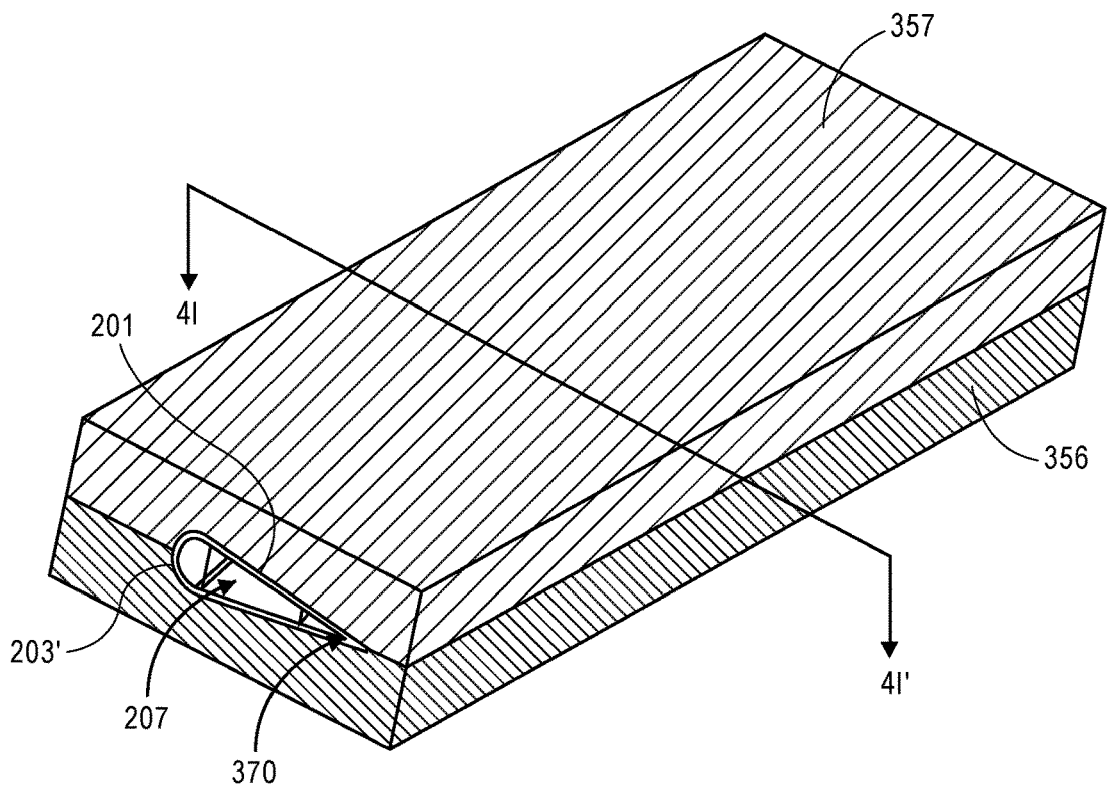
Figure 4I:
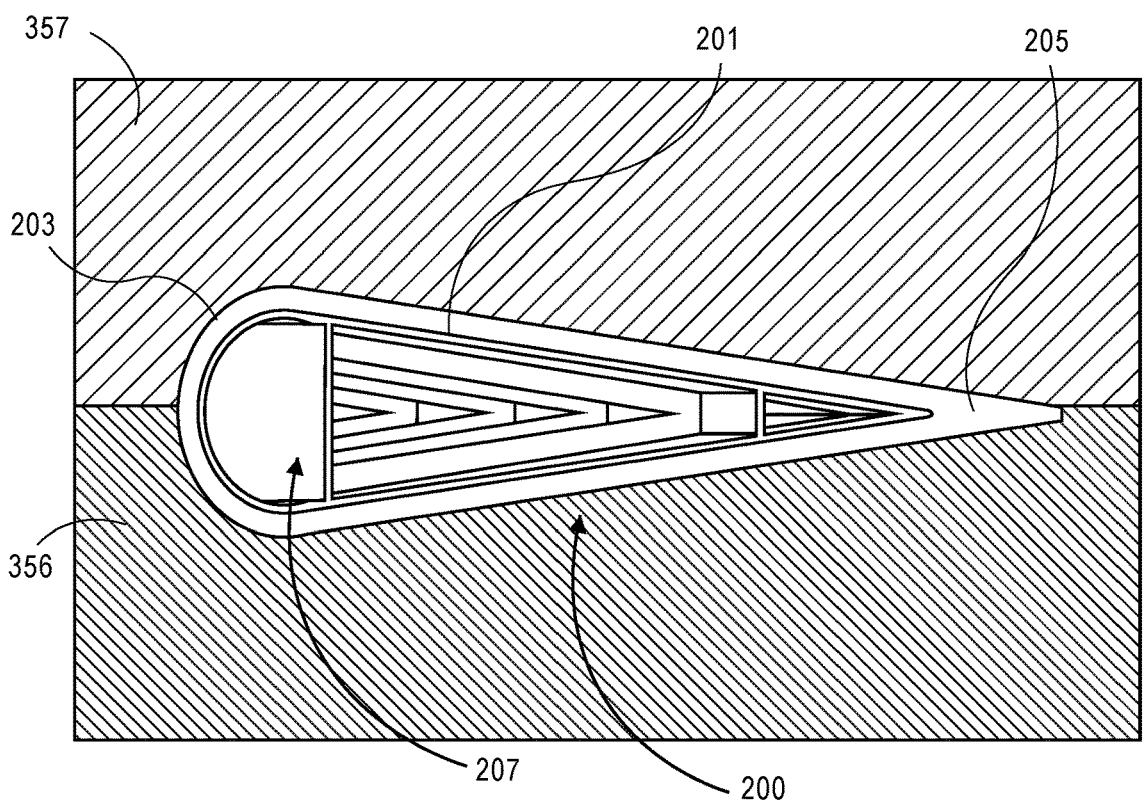
Figure 4J:
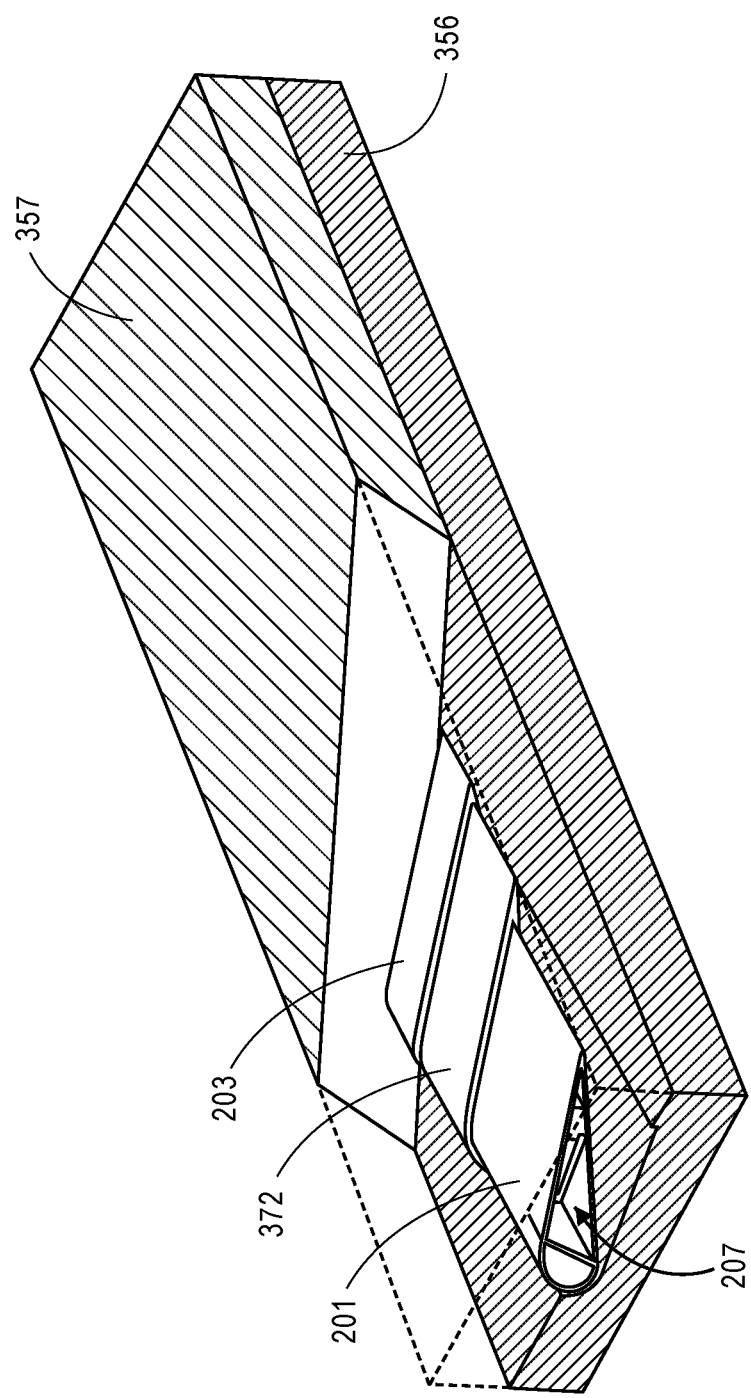

As illustrated in FIGS. 4H-4J, a filler 205 is provided between the bag carrier 207 and the outer skin 203. For example, the providing of the filler may include at least partially filling the space 371 located between the bag carrier 207 and the outer skin 203 with a filler. In an implementation, the filler comprises a flowable filler material, such as an uncured resin, which may be a liquid or a gel or a flowable foam (such as an expandable foam). In an implementation, the filler 205 comprises a solid such as an at least partially cured resin. In an implementation, the providing of the filler may comprise at least partially filling the space between the bag carrier and the outer skin with a flowable filler material. For example, the flowable filler material comprises an uncured resin and the method may also include curing the uncured resin to form a cured resin. In an implementation, the flowable filler material comprises a liquid foam and the method may include solidifying the liquid form to form a solid foam. In an implementation, the filler comprises an uncured resin.

In an embodiment, the filler 205 may comprise a thickness that is within 20% of the thickness of the outer skin. For example, filler 205 may attain a thickness of from about 0.002" to about 1", for example, from about 0.05" to about 0.125".

Figure 4K:
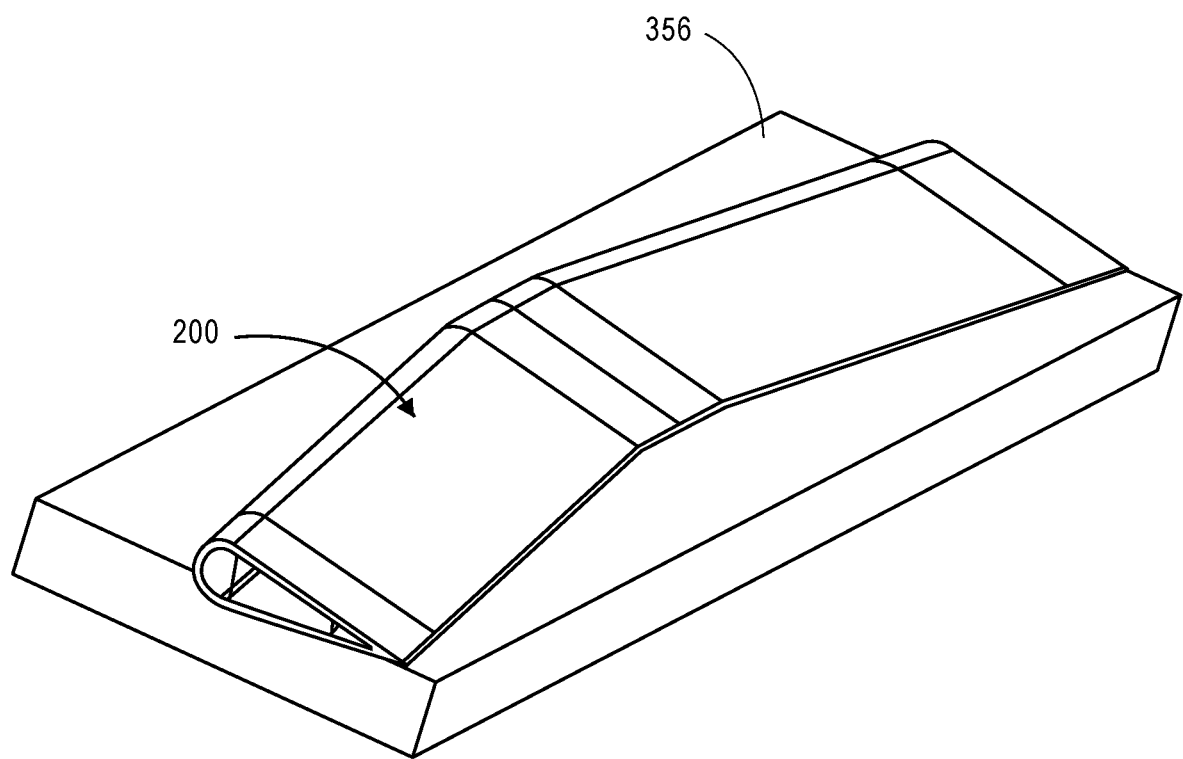

The outer skin layer and the inner skin layer may be co-cured in the mold, removed from the mold and may form a composite article 200 as shown in FIG. 4K. For example, the outer skin may be formed by wrapping plies of a composite around the vacuum bag 372 to form an uncured outer skin, then co-curing the outer skin in the OML tool along with other composite structural components of the composite article.

Figure 5:
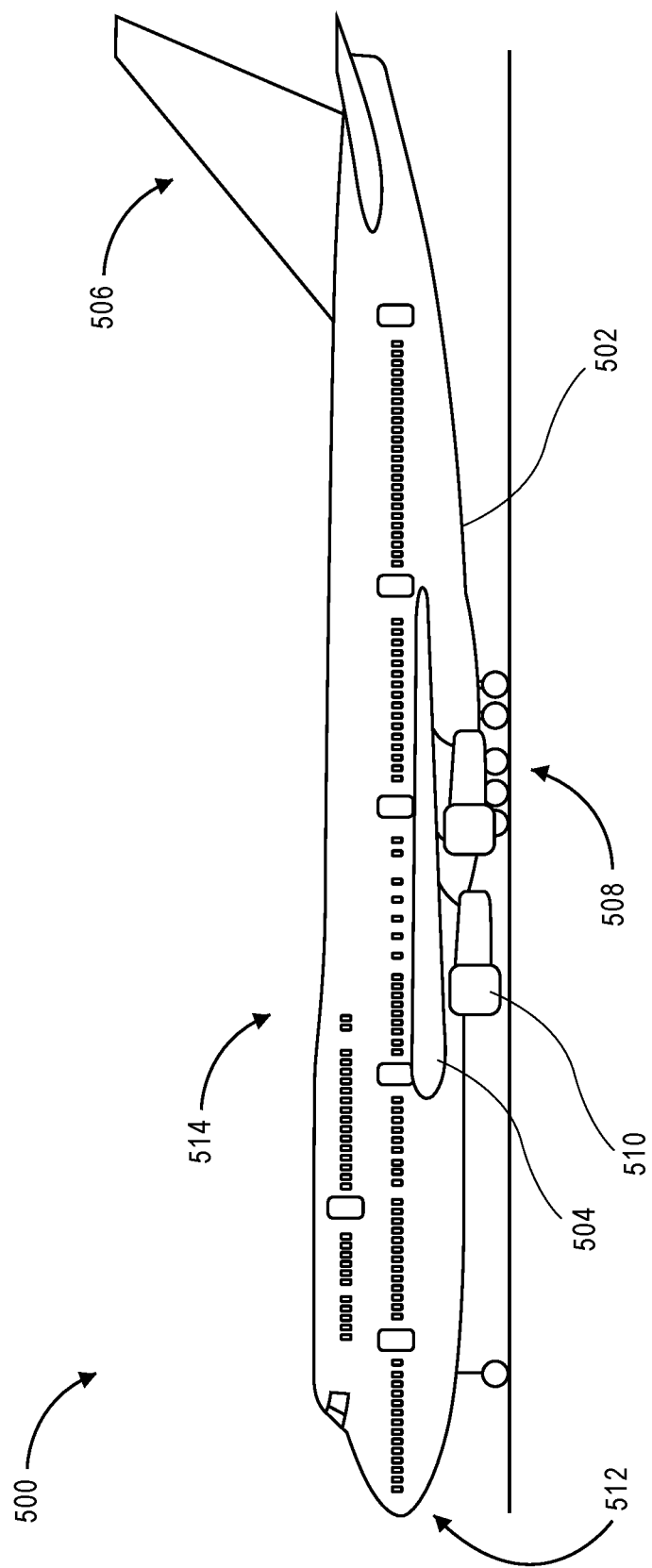
FIG. 5 is a schematic illustration of an aircraft that includes a composite article, such as a composite cocure part, that comprises a fly-away bag carrier.

FIG. 5 is a side elevation view of an aircraft 500 having one or more composite parts such as composite article 200 in accordance with another example of the disclosure. One of ordinary skill in the art will appreciate that composite parts may be employed in a wide variety of locations, including the fuselage, wings, empennage, body, and walls of the aircraft 500. In alternate examples, composite parts may be used on other types of structures, vehicles, and platforms, such as motor vehicles, aircraft, maritime vessels, or spacecraft, or other suitable applications.

In this example, the aircraft 500 includes a fuselage 502 including wing assemblies 504, a tail assembly 506, and a landing assembly 508. The aircraft 500 further includes one or more propulsion units 510, a control system 512 (not visible), and a host of other systems and subsystems that enable proper operation of the aircraft 500. A composite article that includes an integrated bag carrier (i.e., a fly-away bag carrier) may be employed in any suitable portion of the aircraft 500, such as in wing assemblies 504, tail assembly 506, and any other suitable areas of the aircraft 500. In general, the various components and subsystems of the aircraft 500 may be of known construction and, for the sake of brevity, will not be described in detail herein.

Although the aircraft 500 shown in FIG. 5 is generally representative of a commercial passenger aircraft, including, for example, the 737, 747, 757, 767, 777, and 787 models commercially available from The Boeing Company of Chicago, Ill., the inventive composite article and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned air vehicle.

Figure 6:
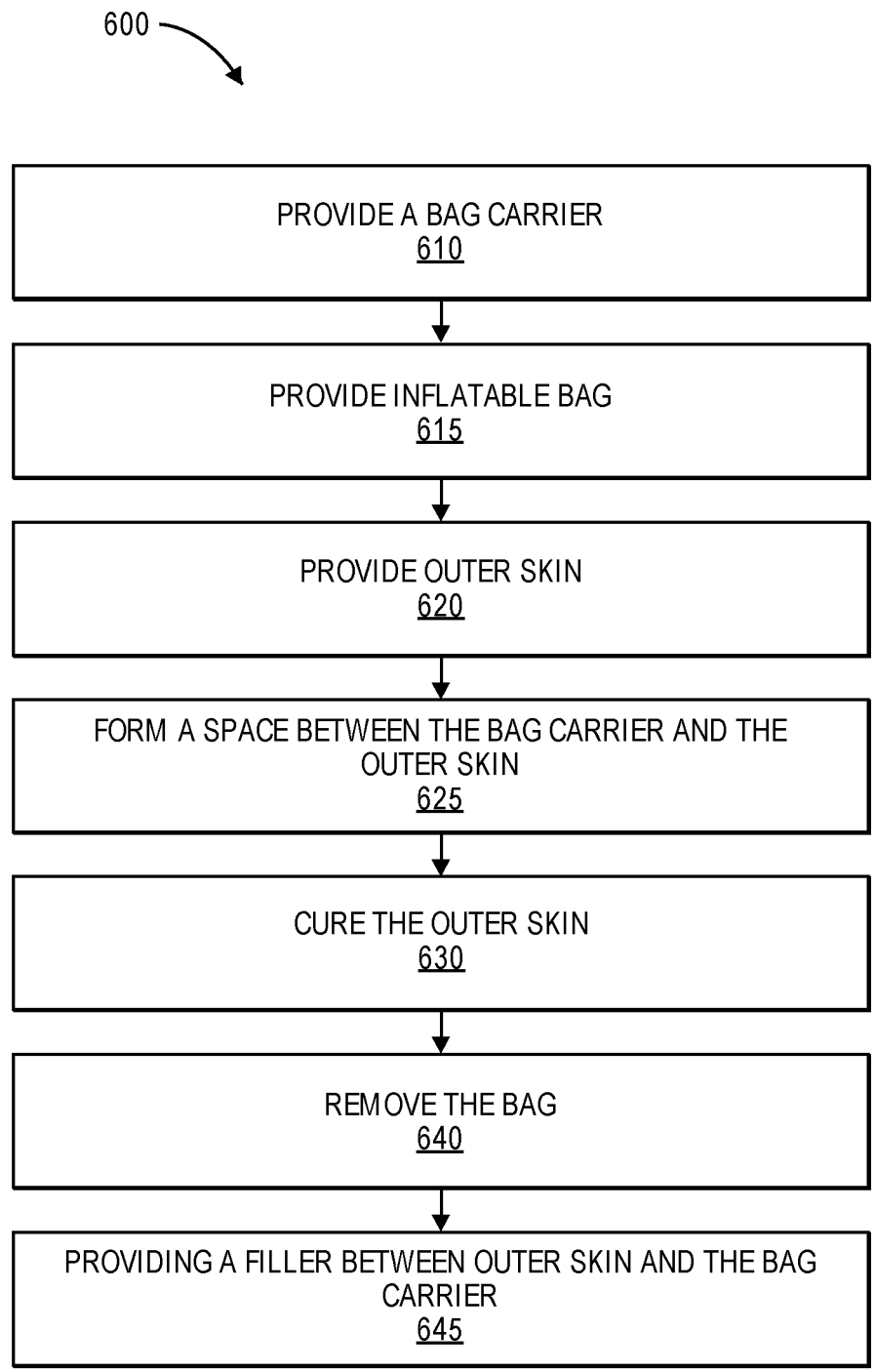
FIG. 6 includes a flow chart that illustrates the operations in a method for manufacturing a composite article that comprises an integrated bag carrier according to an embodiment.

Referring to the flow diagram of FIG. 6, with additional reference to the composite article 200 of FIG. 2, the tooling system 350 of FIG. 3 and the operations shown in FIGS. 4A-4K as described above, a method 600 may be utilized for forming the composite article 200, such as an air vehicle wing, that comprises an integrated, fly-away bag carrier.

At operation 610, a bag carrier such as bag carrier 207 is provided. In an example, bag carrier 207 may be provided by joining individual structural components 209 (e.g., trusses, beams, ribs, strings, etc.). In an example, bag carrier 207 may be formed by additive manufacturing such as by 3-D printing. In some implementations of a 3-D printed bag carrier 207, the structural components 209 may be individually fabricated or may be fabricated as part of a single bag carrier structure. It is noted, however, that the providing of the bag carrier 207 is not so limited. Accordingly, the bag carrier may comprise any suitable material(s) and may be formed according to any suitable method.

At operation 615, a vacuum bag 372 is provided. In an example, a vacuum bag system 370 comprises the vacuum bag. In an example, at operation 615, a vacuum bag 372 may be placed to at least partially surround the bag carrier 207. In an implementation of operation 615, the bag carrier 207 may be positioned within a cavity of the vacuum bag 372. In an implementation, the vacuum bag 372 may be at least partially wrapped around the bag carrier 207. In an implementation, the vacuum bag 372 may comprise one continuous bag (e.g., an envelope bag). The vacuum bag may conform to a surface of the bag carrier, for example, a surface of inner skin 201. For example, the vacuum bag may be expandable such that, upon a vacuum being applied to it, it conforms to surfaces at some locations while it also provides structural support to other surfaces. In an implementation, the vacuum bag may be expandable such that it can be pressurized internally, may be collapsible such it can be evacuated and confirm to surfaces on which it is placed. In an implementation, the vacuum bag may be placed in gaseous communication with the ambient environment. Exemplary vacuum bags include, but are not limited to those made from nylon, latex and/or elastomeric materials. The vacuum bag may be defined by sidewalls having thicknesses of between about 0.0002" to about 0.125" thickness. For example, a nylon vacuum bag may comprise a sidewall thickness of from about 0.002" to 0.005", a latex vacuum bag may be defined by a sidewall thickness of from about 0.010" to about 0.050" thick, and an elastomeric vacuum bag may comprise a sidewall thickness of from about 0.020" to about 0.125". However, the type of bag, bagging material and thickness may be based on shape complexity of the co-cured composite article 200 or the components of the composite article 200, such as the bag carrier, the cure temperature of, for example, composite materials used in forming the inner skin, outer skin and/or support structures, and/or the requirements for the removal of the bag after curing of the inner/outer skin(s).

At operation 620, outer skin 203 is provided. For example, the outer skin 203 may be positioned so that it at least partially surrounds the vacuum bag 372. In an implementation of operation 620, the providing of the outer skin 203 comprises providing at least one uncured composite layer. In a later operation, the at least one uncured composite layer is cured to form the outer skin. The bag carrier 207, vacuum bag 372 and outer skin 203 may be placed together in a closed mold tooling system such as tooling system 350 comprising upper mold 357 and a lower mold 356.

At operation 625, a space is formed between the bag carrier and the outer skin is formed. For example, an internal volume of vacuum bag 372 may be connected to a vacuum system and at least partially evacuated. As the vacuum bag is evacuated, the atmospheric pressure exerts a force on outside surface portions of the vacuum bag thereby causing some portions to seemingly fill a space 371 that is defined between the outer skin and the bag carrier. That is, the vacuum bag 372 may be evacuated such that it conforms to the shape defined by the inner mold surface. According, surface portions of the vacuum bag press against the outer skin and conforms the outer skin to mold surfaces of upper mold 357 and lower mold 356.

At operation 630, a curing of the outer skin is performed. In an implementation, the curing of the outer skin comprises applying heat to at least one uncured composite layer. In an implementation, the curing is performed while the vacuum bag is being evacuated, for example, via connection to a vacuum pump. Thus, as the outer skin cures, it remains pressed by the inflated bag against the mold surface defined by, for example, the lower mold 356 and/or upper mold 357 of a closed mold tooling system such as tooling system 350, and thereby adapts to and retains a shape defined by the mold surface. In some examples, curing comprises heating uncured composites of the inner skin 201 and/or outer skin 203 to a temperature at which the resin that is used to form the uncured composite material will at least partially cure. In addition the outer skin may be subjected to pressure. The specific temperature and pressure applied to the outer skin may be a function of the materials from which the outer skin is constructed. As described above, by way of example, the outer skin may comprise a composite material, for example, a carbon fiber and composite materials used in the aerospace industry such as carbon fiber are commonly heated to a temperature range between from about 30° C. to about 200° C., and are subjected to pressures between 15 and 100 psi.

As described above, the vacuum bag may be placed to at least partially surround the bag carrier 207. As described at operation 640, the vacuum bag may be removed. For example, after curing as described above, the vacuum bag may be removed from between the bag carrier 207 and the outer skin 203. In an implementation for removing the bag, the vacuum bag 372 may be depressurized by venting to the outside environment and then physically removed from between the bag carrier and the outer skin. Although the vacuum bag 372 is described as being physically removed, other implementations are not so limited. For example, the bag may comprise a material that may be chemically etched or may be dissolved by a solvent. In any case, the space between the bag carrier and the outer bag as defined by the vacuum bag portions that remain after the bag is removed. In an example, the space comprises a width of from about 0.002" to about 0.150" width. In an example, the space comprises a width that is substantially equal to or less than a thickness of the outer skin.

At operation 645, a filler 205 is provided between the outer skin and the bag carrier. In an example, providing of the filler comprises at least partially filling the space between the bag carrier and the outer sin with a flowable filler material. In an implementation, the flowable filler material comprises a resin, such as an uncured resin. Accordingly, the uncured resin may be cured to form a cured resin that forms bonds to the bag carrier (including the inner skin) and bonds to the outer skin thereby attaching the bag carrier and the outer skin to one another. Upon curing thereof, the resin forms a layer comprising a thickness of from about 0.02" to about 1".

In an implementation, the flowable filler material comprises a foam, for example, a liquid foam that can at least partially file the space between the bag carrier and the outer skin. The liquid foam may be solidified to form a solid foam (e.g., an expandable foam). The solid foam comprises a layer thereof that is in the range of from about 10% to 200% of a thickness of the outer skin, including from about 50% to about 100% of a thickness of the outer skin. It is noted that the filler is not limited to any particular material and other materials such as foam, rubber, wax, plastic and others that can be provided to the space between the bag carrier and the outer skin and that can support the outer skin. For example, the filler may comprise a flowable phase, such as a liquid, and may form a non-flowable phase, such as a solid after being introduced into the space between the bag carrier and the outer skin.

In an implementation, the filler is provided between the bag carrier and outer skin and may comprise one or more of a resin, a rubber, plaster of paris, and an expandable foam As a result of practicing the various examples and implementations described herein, a fly-away bag carrier that remains as a structural portion of a composite article (e.g., a fly-away part) may be formed.

While the examples have been illustrated respect to one or more implementations, alterations and/or modifications may be made to the illustrated examples without departing from the spirit and scope of the appended claims. In addition, while a particular feature of the examples may have been disclosed with respect to only one of several implementations, such feature may be combined with one or more other features of the other implementations as may be desired and advantageous for any given or particular function. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects of the present teachings. It will be appreciated that structural components and/or processing stages may be added or existing structural components and/or processing stages may be removed or modified.

Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated example. Finally, "exemplary" indicates the description is used as an example, rather than implying that it is an ideal.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the descriptions disclosed herein. It is intended that the specification and examples be considered as exemplary only, with a true scope and spirit of the examples being indicated by the following claims.

What is claimed is:

1. A method for forming a co-cured composite article, comprising:
    positioning a vacuum bag at least partially around a bag carrier;
    positioning an outer skin at least partially around the vacuum bag;
    evacuating a first gas from the vacuum bag to generate an internal compaction pressure against the bag carrier, wherein the internal compaction pressure forms a space between the bag carrier and the outer skin;
    curing the outer skin while the bag carrier is under the internal compaction pressure;
    introducing a second gas into the vacuum bag after the outer skin is cured;
    at least partially removing the vacuum bag from between the bag carrier and the outer skin after the second gas is introduced into the vacuum bag; and
    introducing a filler into the space after the vacuum bag is at least partially removed.

2. The method of claim 1, wherein the providing of the filler comprises at least partially filling the space between the bag carrier and the outer skin with the filler.

3. The method of claim 2, wherein the filler comprises an uncured resin.

4. The method of claim 3, further comprising at least partially curing the uncured resin in the space to form an at least partially cured resin.

5. The method of claim 4, wherein the cured resin comprises a thickness of from about 0.02" to about 1".

6. The method of claim 2, wherein the filler material comprises a liquid foam.

7. The method of claim 6, further comprising solidifying the liquid foam in the space to form a solid foam.

8. The method of claim 7, wherein a thickness of the solid foam is in a range of from about 10% to about 200% of a thickness of the outer skin.

9. The method of claim 1, wherein the filler comprises plaster of paris.

10. The method of claim 1, wherein positioning the outer skin comprises positioning at least one uncured composite layer onto an outer surface of the bag carrier.

11. The method of claim 10, further comprising at least partially curing the at least one uncured composite layer while the vacuum bag is pressurized.

12. The method of claim 11, further comprising removing at least a portion of the vacuum bag from between the outer skin and the bag carrier after the vacuum bag is pressurized and before the filler is provided.

13. The method of claim 11, wherein the bag carrier comprises support structures that are at least partially wrapped by an inner skin.

14. The method of claim 11, wherein the providing of the bag carrier comprises 3-D printing the bag carrier.

15. The method of claim 11, further comprising positioning the bag carrier, the vacuum bag, and the outer skin into a mold, wherein the vacuum bag is pressurized while in the mold.

16. The method of claim 11, wherein positioning the vacuum bag at least partially around the bag carrier comprises positioning the vacuum bag around the bag carrier.

17. A method, comprising:
positioning a vacuum bag around a bag carrier;
positioning an outer skin at least partially around the vacuum bag, wherein the outer skin comprises an uncured composite layer;
positioning the bag carrier, the vacuum bag, and the outer skin at least partially into a mold;
evacuating a first gas from the vacuum bag to generate an internal compaction pressure against the bag carrier, wherein the internal compaction pressure forms a space between the bag carrier and the outer skin while the bag carrier and the outer skin are in the mold;
curing the outer skin while the bag carrier is under the internal compaction pressure;
introducing a second gas into the vacuum bag after the outer skin is cured;
at least partially removing the vacuum bag from between the bag carrier and the outer skin after the second gas is introduced into the vacuum bag; and
introducing a filler into the space after the vacuum bag is at least partially removed.

18. The method of claim 17, wherein, as the first gas is evacuated from the vacuum bag, a first portion of the vacuum bag appears to collapse, and a second portion of the vacuum bag appears to inflate, and wherein the space is formed between the bag carrier and the outer skin proximate to the second portion of the vacuum bag.

19. The method of claim 18, wherein the second portion of the vacuum bag presses the outer skin against the mold, which causes the outer skin to conform to a shape of the mold as the outer skin is cured.

20. The method of claim 17, wherein the filler comprises a foam that is in a liquid state when introduced into the space, and wherein the method further comprises solidifying the filler into a solid state once the filler is in the space, wherein the filler has a thickness that is from about 0.05 inches to about 0.125 inches, and wherein the thickness of the filler in the solid state is from about 50% to about 100% of a thickness of the outer skin.

21. The method of claim 17, wherein the filler comprises rubber.

22. The method of claim 17, wherein the filler comprises wax.

23. The method of claim 17, wherein the filler comprises plastic.

24. The method of claim 17, wherein the space has a thickness that is less than a thickness of the outer skin.

25. The method of claim 17, wherein the filler has a thickness that is less than a thickness of the outer skin.

* * * * *